United States Patent [19]

Shimada et al.

[11] Patent Number: 4,986,127
[45] Date of Patent: Jan. 22, 1991

[54] MULTI-FUNCTIONAL SENSOR

[75] Inventors: Satoshi Shimada; Seiichi Ugai, both of Hitachi; Akira Sase; Yasushi Shimizu, both of Katsuta, all of Japan

[73] Assignee: Hitachi, Ltd., Tokyo, Japan

[21] Appl. No.: 333,246

[22] Filed: Apr. 5, 1989

[30] Foreign Application Priority Data

Apr. 6, 1988 [JP] Japan .................. 63-82961

[51] Int. Cl.⁵ .................. G01L 7/08; G01L 9/06; G01L 13/06
[52] U.S. Cl. .................. 73/714; 73/721; 73/861.61; 338/4; 374/143
[58] Field of Search .................. 374/143; 73/714, 720, 73/721, 726, 727, DIG. 4, 706, 708, 861.61; 338/4, 42

[56] References Cited

U.S. PATENT DOCUMENTS

| | | | |
|---|---|---|---|
| 3,341,794 | 9/1967 | Stedman | 73/720 |
| 3,397,278 | 8/1968 | Pomerantz | 174/52 |
| 4,530,244 | 7/1985 | Starr | 73/727 |
| 4,798,093 | 1/1989 | Kenoun | 73/720 |

FOREIGN PATENT DOCUMENTS

| | | |
|---|---|---|
| 61-56465 | 3/1986 | Japan . |
| 58-167432 | 4/1989 | Japan . |
| 0746221 | 7/1980 | U.S.S.R. ............... 73/720 |

OTHER PUBLICATIONS

"Smart Electronics to Improve Pressure Transmitter Performance", Iecon, 1984.

*Primary Examiner*—Donald O. Woodiel
*Attorney, Agent, or Firm*—Antonelli, Terry, Stout & Kraus

[57] ABSTRACT

Multi-functional sensor comprises a support base made from borosilicate, a diaphragm with a E-shaped section secured to the base, the diaphragm being made from single crystalline silicon, principal plane thereof being oriented to be a crystalline plane (110), a differential pressure sensor having p-doped piezoresistor elements formed in the principal plane of the diaphragm at a thin wall portion of the E-shaped sectional diaphragm, each element being arranged along a crystal axis <111>, a static pressure sensor having p-doped piezoresistor elements formed in the principal plane at an outer peripheral thick wall portion of the E-shaped sectional diaphragm, each element being arranged along the crystal axis <111>, and a temperature sensor having a p-doped piezoresistor element formed in the principal plane at the outer peripheral thick wall portion of the E-shaped sectional diaphragm, the element being arranged along the crystal axis <100>. In the multi-functional sensor thus constructed, deviation of the output signal from the differential pressure sensor due to the influence of the temperature and static pressure can be removed easily to obtain the correct signal.

5 Claims, 7 Drawing Sheets

MULTI-FUNCTIONAL SENSOR

FIELD OF INVENTION

The present invention is concerned with a multi-functional sensor capable of sensing or detecting multiple physical quantities or having multi-transducer functions. More particularly, the present invention relates to a sensor suitable for use in differential pressure single transmitter.

RELATED ARTS

Figure 6A:
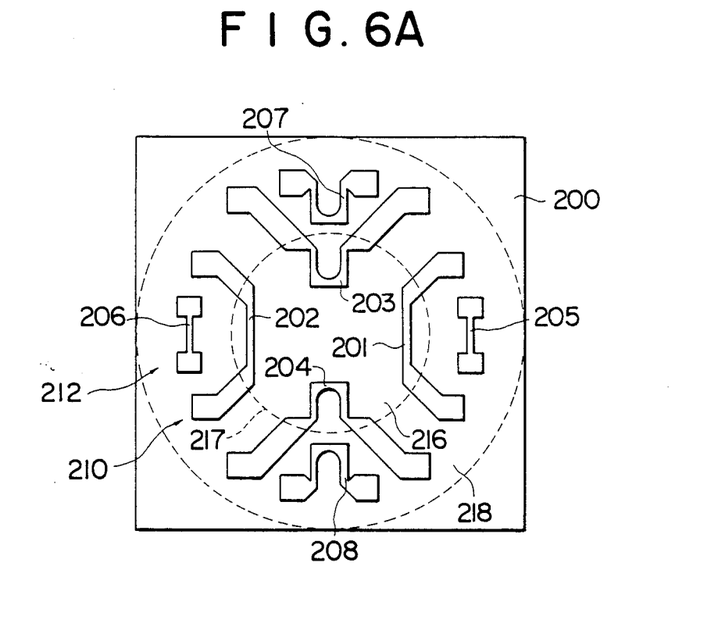
FIG. 6 is a plan view of a conventional multi-functional sensor.
Figure 6B:
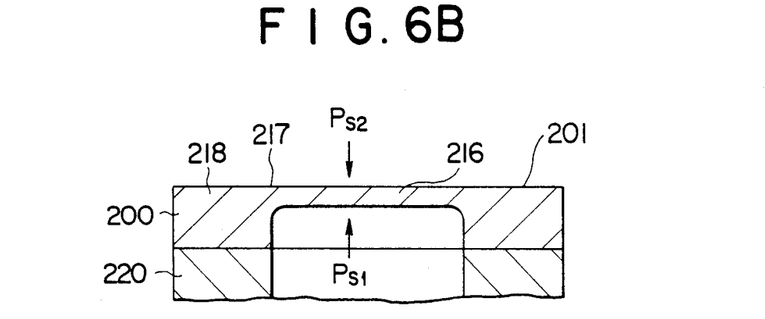
FIG. 6B is a sectional view of the sensor of FIG. 6A.

The above-mentioned type of semiconductor pressure transducer is disclosed, for example, in U.S. Pat. No. 4,530,244. The semiconductor pressure transducer disclosed in the Patent Specification above includes, as shown in FIGS. 6A and 6B, a single crystalline silicon diaphragm 200 having U-shaped section (FIG. 6B). Diffusion resistors 201, 202, 203, 204, 205, 206, 207, 208, each serving as a piezoresistor, are formed in the outer flat surface of the diaphragm 200 so as to detect a differential pressure $\Delta p = Ps_2 - Ps_1$, the static pressure $Ps \simeq Ps_1 \simeq Ps_2$, or the like, where "$Ps_2$" represents the pressure applied to the outer surface of the thin wall portion 216 of the diaphragm 200, and "$Ps_1$" represents the pressure applied to the inner surface of the thin wall portion 216 of the diaphragm 200. The piezoresistors 201, ..., 204 situated at the thin wall portion 216 in the vicinity of a boundary region 217 between the thin wall portion 216 and thick wall portion 218 cooperatively constitute a differential pressure sensor 210, while the piezoresistors 205, ..., 208 situated at the thick wall portion 218 cooperatively constitute a static pressure sensor 212.

The principal plane or outer surface 201 of the diaphragm 200 was conventionally selected to be a plane (100) of single crystalline silicon.

The properties of the multi-functional sensor having piezoresistors made of diffusion resistors integrated in such a single crystalline semiconductor chip are described more in detail in J. E. Corley et al, "The Application of Smart Electronics to Improve Pressure Transmitter Performance", IECON'84 p.p. 1081–1086. Corley et al explains at page 1082 in particular that the resistivity of each piezo-resistor element depends on its strain or deformation and temperature, and therefore the output of each sensor constituted by a circuit made of one or more piezo-resistor(s) depends on all of the differential pressure $\Delta p$, the static pressure $Ps$, and the temperature T as shown in the following equation (expression of the parameters being changed):

$$E_T = f_1(\Delta p, Ps, T) \quad (1)$$

$$E_{Ps} = f_2(\Delta p, Ps, T) \quad (2)$$

$$E_{\Delta p} = f_3(\Delta p, Ps, T) \quad (3)$$

where
$E_T$: output of temperature sensor,
$E_{Ps}$: output of static pressure sensor,
$E_{\Delta p}$: output of differential pressure sensor,
T: temperature,
Ps: static pressure, and
$\Delta p$: differential pressure.

In principle, if three characteristic equations are provided for each of the sensors, the differential pressure $\Delta p$, the static pressure Ps, and the temperature T can be derived.

However, as the outputs of the actual sensors depend nonlinearly on the three parameters $\Delta p$, Ps and T, the characteristic equations should unavoidably include higher order terms of the parameters and cross-terms of the parameters. Therefore, it is actually necessary to approximately solve a large number of equations including cross-terms so as to derive the differential pressure $\Delta p$, static pressure Ps, and temperature T within a desired accuracy. Accordingly, the processing time required to solve the equations is considerably long.

Now, we will explain the conventional multi-functional sensor more concretely taking the case where the multi-functional sensor is used for the measurement of flow rate of fluid flowing through a pipeline as an example.

When an orifice is provided in a flow passage in the pipeline, the pressure difference or differential pressure $\Delta p$ is produced between upstream and downstream ends of the orifice. As is well known, the flow rate Q is proportional to the square-root of the differential pressure $\Delta p$ within a certain range of flow rate, and can be expressed by the following equation (4):

$$Q = k \cdot \Delta p \quad (4)$$

where k is a constant defined by Reynolds number.

As the output $E_{\Delta p}$ of the differential pressure sensor is, as seen from the equation (3), dependent on all of the differential pressure $\Delta p$, static pressure Ps, and temperature T, the static pressure Ps in the pipeline and the ambient temperature T act as disturbances against the measurement of the flow rate Q, when the flow rate Q is derived from the output $E_{\Delta p}$ detected by the differential pressure sensor 210.

Even when the static pressure Ps is detected by the static pressure sensor 212 so as to correct the deviation or errors in the output $E_{\Delta p}$ of the differential pressure sensor 210 due to the influence of the static pressure Ps in the conventional multi-functional sensor, the processing required for the correction becomes complicated and cumbersome, because the output $E_{ps}$ per se of the static pressure sensor 212 depends on the differential pressure $\Delta p$. There is also a similar problem in the temperature-dependence, if the output $E_T$ of the temperature sensor is expressed by the equation (1).

Under the circumstances, it has been desired to provide hardware enabling the sensor to detect the differential pressure $\Delta p$ to minimized the dependence on the other parameters such as static pressure Ps and temperature T, so as to minimize the complicated program-controlled data processing, although it is essentially impossible not to be dependent on the static pressure Ps and the temperature T.

SUMMARY OF THE INVENTION

An object of the present invention is to provide a multi-functional sensor capable of producing outputs of differential pressure, static pressure and temperature which can be separated easily and therefore enable calculation for the static pressure- and temperature-corrections of the differential pressure to be made easily.

According to the present invention, the above-mentioned object can be attained by a multi-functional sensor having a temperature sensor responsive only to the temperature T irrespective of the differential pressure Δp and the static pressure Ps, and a static pressure sensor irresponsive to the differential pressure Δp.

Accordingly, the outputs $E_T$, $e_{Ps}$, $e_{66p}$ of the temperature, static pressure and differential pressure sensors according to the present invention can be expressed by the following equations:

$$e_T = f_1(T) \qquad (5)$$

$$e_{Ps} = f_2(Ps, T) \qquad (6)$$

$$e_{\Delta p} = f_3(\Delta p, Ps, T) \qquad (7)$$

In a multi-functional sensor according to a preferred embodiment of the present invention, a principal plane of the silicon diaphragm having E-shaped section comprises a plane (110) of single crystal silicon, differential pressure sensor comprises piezoresistors extending into the crystalline axis <111> in the principal plane at an annular thin wall portion of the diaphragm static pressure sensor comprises piezoresistors extending into the crystalline axis <111> in the principal plane at an optimal radial position of outer peripheral thick wall portion the diaphragm, and a temperature sensor resistor is formed in the principal plane at the outer peripheral thick wall portion to extend in the crystalline axis of <100>.

The accurate differential pressure Δp can be obtained from the outputs $e_T$, $e_{Ps}$, and $e_{\Delta p}$ of the three sensors expressed by the equations (5) to (7) in the multi-functional sensor of the present invention.

More concretely, the detection outputs $E_T$, $e_{Ps}$, $e_{\Delta p}$ of the temperature sensor, static pressure sensor and differential pressure sensor respectively dependent on the temperature T, static pressure Ps and differential pressure Δp are picked up at first. Then the output $e_{Ps}$ of the static pressure sensor is temperature-corrected on the basis of the output $e_T$ of the temperature sensor to obtain the correct static pressure output $P_s$, and the output $e_{\Delta p}$ of the differential pressure sensor is static pressure- and temperature-corrected to obtain the correct differential pressure output Δp.

In the multi-functional sensor of the present invention, as the output $e_T$ of the temperature sensor is dependent only on the temperature T, the temperature-dependent outputs of the other sensors can be easily corrected. In addition, as the output $e_{Ps}$ of the static pressure sensor is not responsive to the differential pressure Δp, the correct static pressure Ps can be derived only by the temperature correction. Accordingly, the calculation required for obtaining the correct differential pressure Δp in the multi-functional sensor is considerably simplified compared with that in the conventional multi-functional sensors.

BRIEF EXPLANATION OF DRAWINGS

The foregoing and other objects as well as advantages of present invention will be made clearer in the description hereinafter referring to the drawings in which.

EXPLANATION OF PREFERRED EMBODIMENTS

Figure 5A:
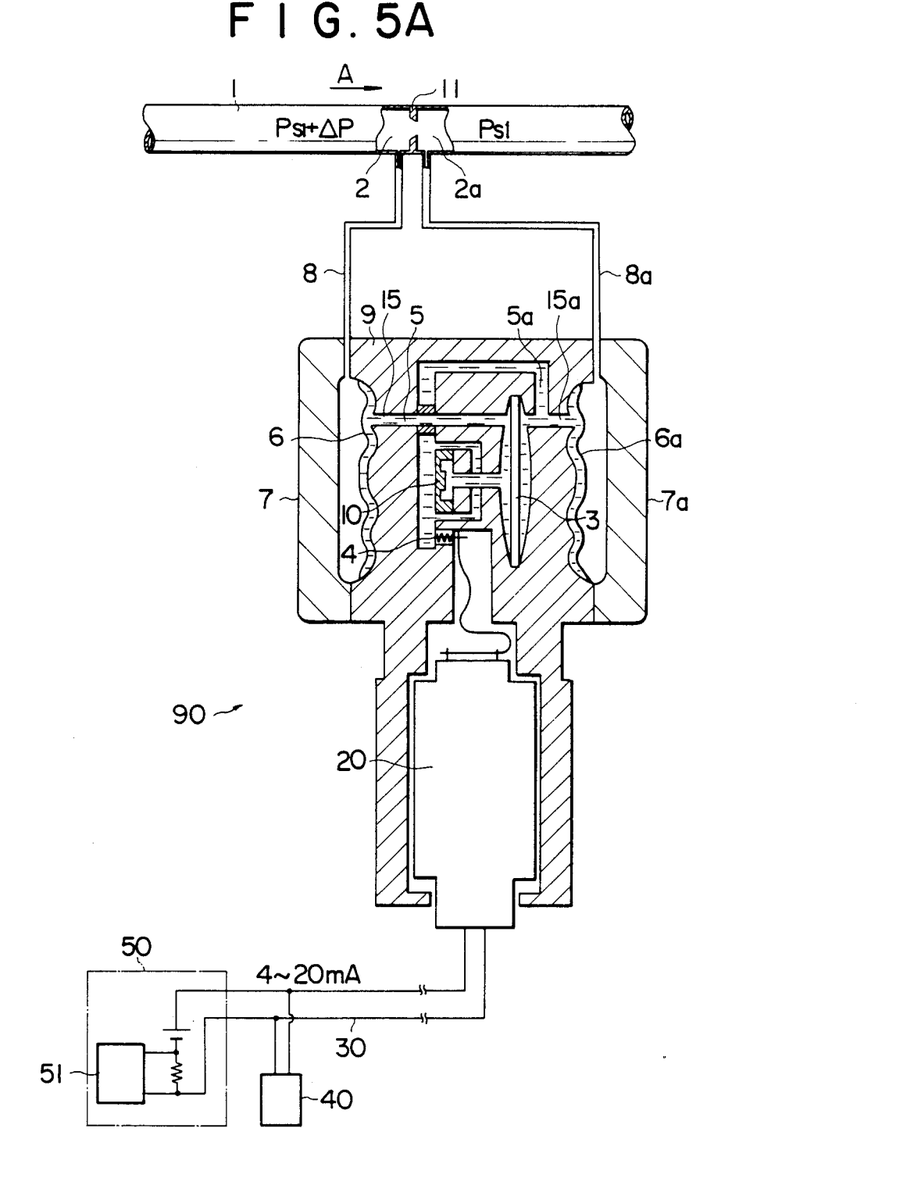
FIG. 5A is an explanatory view of a differential pressure transmitter having the multi-functional sensor according to an preferred embodiment of the present invention.

A multi-functional sensor is used for example in the form of a sensor 10 in a differential pressure transmitter 90 for an industrial measuring instrument as shown in FIG. 5A where the flow rate Q of fluid pressurized by a pump (not shown) through a pipeline 1 in a direction A is detected. When a orifice 11 is provided in a flow-passage in the pipeline 1, a pressure difference or differential pressure Δp is generated between upstream and downstream ends 2, 2a of the orifice 11. The relationship of the flow rate Q with the differential pressure Δp can be expressed, as explained below, by the equation (4), that is $$Q = k \cdot \Delta p \qquad (4)$$

The pressures at the upstream and downstream ends 2, 2a of the orifice 11 are led through respective conduits 8, 8a into casings 7, 7a, 9 where the sensor 10 is placed. A pressure receiving portion includes a center diaphragm 3 having a thickness of approximately 0.1 mm for example. A chamber 15 defined by diaphragms 3, 6 and one face of a silicon diaphragm 10a of the sensor 10 is designed to have a volume identical with that of a chamber 15a defined by diaphragms 3, 6a and another face of the silicon diaphragm 10a. The pressures $Ps_2$, $Ps_1$ led through the higher and lower pressure conduits 8, 8a are transferred to sealed liquid 5, 5a in the chambers 15, 15a through the seal diaphragms 6, 6a respectively. The pressures are further applied through the sealed liquid 5, 5a such as silicone oil to one and another sides or faces of the silicon diaphragm 10a to apply a static pressure $Ps \simeq Ps_1 \simeq Ps_2$, and a differential pressure $p = Ps_2 - Ps_1$ to the sensor 10.

The sensor 10 having diffusion resistors formed in the single crystalline silicon diaphragm 10a is multi-functional capable of detecting the differential pressure Δp, static pressure Ps, and the temperature T.

A multi-functional sensor according to a preferred embodiment of the present invention is now explained more in detail with reference to FIGS. 1A, 1B, 1C, 3A and 4.

The sensor 10 comprises the silicon diaphragm 10a made of a single crystalline silicon having a principal face 18 oriented to be a plane (110) of the single crystal silicon, a differential pressure sensor 30, a temperature sensor 32 and a static pressure sensor 34, each of the sensors 30, 32, 34 having one or more diffusion resistors formed in the principal face 18 of the silicon diaphragm 10a. The silicon diaphragm has an E-shaped section as seen from FIG. 1B.

Figure 1A:
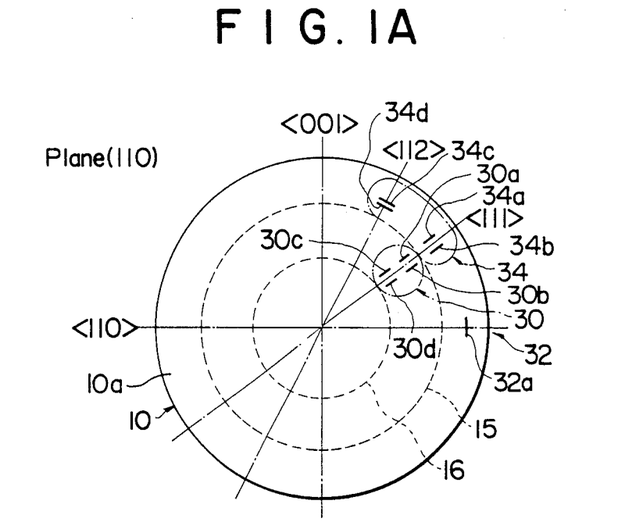
FIG. 1A is a plan view of a multi-functional sensor according to a preferred embodiment of the present invention.
Figure 1B:
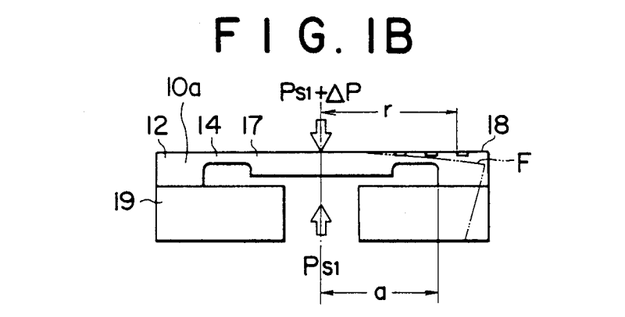
FIG. 1B is a sectional view of the multi-functional sensor of FIG. 1A.
Figure 1C:
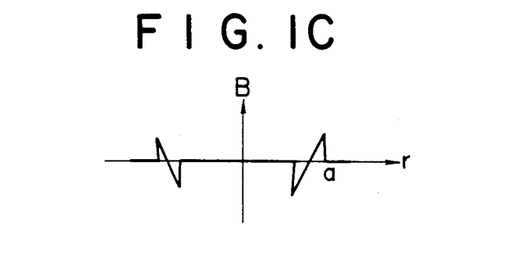
FIG. 1C is a graph showing a stress distribution due to expansion/contraction characteristics of an outer flat surface or principal plane of the diaphragm having E-shaped section.

FIG. 1C illustrates a stress distribution on the circular disk-like diaphragm 10a with the E-shaped section, where maximum stress B is produced at an outer periphery 15 of a thin wall portion 14, while maximum stress B is simultaneously produced at an inner periphery 16 of the thin wall portion 14, while the magnitude of stress B at portions other than the parts 15, 16 is relatively small. The stress distribution characteristics of the diaphragm with the E-shaped section per se is disclosed in the Japanese Patent Application Laid-Open No. 56-87196(A).

The differential pressure sensor 30 comprises four piezoresistors 30a, 30b, 30c, 30d formed in the vicinity of outer and inner peripheries 15, 16 of the thin wall portion 14. Each of the piezoresistors 30a, ..., 30d comprises a p-doped diffusion resistor extending in the crystal axis <111> in the principal plane 18 at the thin wall portion 14 of the silicon diaphragm 10a. The temperature sensor 32 comprises a single p-doped diffusion resistor 32a formed in the principal plane 18 at the outer peripheral thick wall portion 12 of the silicon diaphragm 10a in parallel with the crystalline axis <001>. The static pressure sensor 34 comprises piezo-resistors 34a, 34b in the form of p-doped diffusion resistors extending in parallel with the crystal axis <111> in the principal face 18 at the outer peripheral thick wall portion 12 and piezoresistors 34c, 34d in the form of p-doped diffusion resistors extending in parallel with another crystal axis <111> perpendicular to an axis <112> in the principal face 18 a position situated in the direction of the axis <112> from the center of the diaphragm 10a of at the outer peripheral thick wall portion 12.

As the silicon diaphragm 10a is deformed and therefore subject to nonuniform stress by the differential pressure $\Delta p = P_{s2} - P_{s1}$ and static pressure $P_s \simeq P_{s1} \simeq P_{s2}$, the resistivities of the piezoresistors in the principal face 18 of the silicon diaphragm 10a constituting the differential pressure sensor 30, temperature sensor 32 and static pressure sensor 34 are changed. In this case, the resistivity R of each piezoresistor element can be expressed by the following expression:

$$R = R_0[1 + \alpha T + \pi_l(1 + \beta_l T)\sigma_l + \pi_t(1 + \beta_t T)\sigma_t] \quad (8)$$

where
$R_o$: reference resistivity
$\alpha$: temperature coefficient of resistivity
$\pi_l$: piezoresistivity coefficient in longitudinal direction
$\beta_l$: temperature coefficient of piezoresistivity coefficient in longitudinal direction
$\sigma_l$: stress acting in longitudinal direction
$\pi_t$: piezoresistivity coefficient in transverse direction
$\beta_t$: temperature coefficient of piezoresistivity coefficient in transverse direction, and
$\sigma_t$: stress acting in transverse direction.

If the temperature-dependence of each parameter is taken into consideration up to third order terms or third power terms of temperature, the actual properties can be expressed correctly. However, only the first power term of temperature is shown above for the sake of simplicity.

Figure 3A:
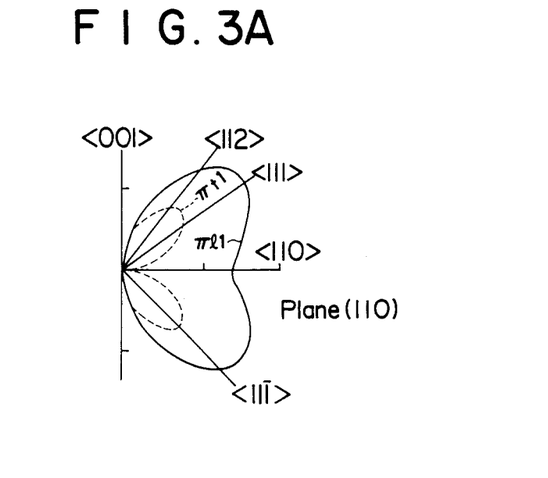
FIG. 3A is a graph showing characteristics of the gauge sensitivities or piezoresistor coefficients of the p-doped diffusion resistor (piezoresistor), for the multi-functional sensor, formed in a principal plane (110) of the single crystalline silicon.

The piezoresistivity coefficients $\pi_l$, $\pi_t$ of the piezoresistor consisting of p-doped diffusion resistor in the single crystalline silicon, i.e. p-type gauge, have anisotropic properties as shown in FIG. 3A.

Each of the p-type gauges or piezoresistors 30a, ..., 30d has a large value of piezoresistivity coefficient $\pi_l$ in the axis <111> and is sensitive in the direction, the resistivities thereof being largely changed in response to the stresses $\sigma_l$, $\sigma_t$ produced by the differential pressure p.

The resistivities of the diffusion resistors 30a, ..., 30d of the differential pressure sensor 30 change, as seen from the equation (8) above, depending not only on the differential pressure $\Delta p$ but also on the temperature T and the static pressure Ps, the detection output $e_{\Delta p}$ is influenced by the temperature T and the static pressure Ps.

As to the temperature sensor 32, change in the resistivity of the resistor element 32a of the temperature sensor 32 in response to the stress is very little, because the piezoresistivity coefficients $\pi_l$, $\pi_t$ are approximately zero in the axis <001>. However, the coefficients are not perfectly zero. Therefore, the diffusion resistor 32a is formed at the outer peripheral thick wall portion 12 where the deformation due to differential pressure is little so as to avoid the influence by the differential pressure.

Thus, the diffusion resistor 32a serves as the temperature sensor 32 which does not respond to either static pressure Ps or differential pressure $\Delta p$, but responds only to the temperature T, as shown by the equation (5). Change in the resistivity thereof depends on the temperature coefficient $\alpha$ of the resistivity. The proportion or ratio of resistivity change is approximately 25% for a temperature change of 100 degree of Centigrade in the case where the diffused impurity is boron and the surface impurity concentration is $10^{18}$ atoms/cm$^3$.

Now, explanation is made about the static sensor 34. The resistivity $R_l$ of each of the piezoresistor elements 34a, 34b and the resistivity of each of the piezoresistor elements 34c, 34d are changed by the application of the static pressure Ps because of the slight deformation of the diaphragm 10a (exaggeratedly) shown by an imaginary line F in FIG. 2B due to the differences in the elastic coefficients of the silicon diaphragm 10a and those of the glass support base 19 adhered to the diaphragm 10a.

"Finite element method" can be used to calculate the stresses $\sigma_l$, $\sigma_l$ at the surface 18 of the silicon diaphragm 10a. Then, the change in the resistivities $R_l$, $R_t$; $R_t$, $R_t$ of the piezoresistors 34a, 34b; 34c, 34d in response to the static pressure Ps can be calculated.

The output $e_{Ps}$ of the bridge constituted by the piezoresistor elements 34a, 34b; 34c, 34d having resistivities $R_l$, $R_t$; $R_t$, $R_t$ can be expressed as follows:

$$e_{Ps} = [(\Delta R_l/R_o) - (\Delta R_t/R_o)] \cdot E/2 \quad (9)$$

where

ΔR$_l$: change in the resistivity of the radially arranged gauge or piezoresistor ΔR$_t$: change in the resistivity of the tangentially arranged gauge or piezoresistor E: voltage applied across the resistor bridge In one preferred embodiment of the present invention, the principal plane 18 of the silicon diaphragm 10a is oriented to be the crystalline plane (110), the radially extending gauges or piezoresistors 34a, 34b are arranged along the crystalline axis <111>, while the tangentially extending gauges or piezoresistors 34c, 34d are arranged at a position situated in the direction of the axis <112> from a center of the diaphragm 10a, in parallel with another crystalline axis <111>, i.e. <111> perpendicular to the axis <112> so that the change in the resistivities R$_l$, R$_l$ and those in the resistivities R$_t$, R$_t$ are opposite in sign, thereby obtaining a large output e$_{Ps}$ of the static sensor 34. The arrangement also serves to fairly suppress the temperature-dependence of the output e$_{Ps}$ of the static pressure sensor 34, when the resistors 34a, . . . , 34d are connected in the form a differential bridge circuit to provide the output e$_{ps}$.

Explanation is made more in detail. The output e$_{Ps}$(Ps) of the static pressure sensor 34 having a circular diaphragm 10a with the E-shaped section depends on Young's moduli and flexural rigidity of the silicon diaphragm 10a and glass base 19 and can be expressed as follows:

$$e_{Ps}(Ps) \propto (H_G/H_S)^3, |E_S - E_G| \quad (10)$$

where

E$_S$: Young's modulus of silicon diaphragm 10a

E$_G$: Young's modulus of glass base 19

H$_S$: thickness of outer peripheral thick wall portion of silicon diaphragm 10a H$_G$: thickness of glass base 19

In studying the dependence on these parameters by means of the finite element method, applicants have found out that the output e$_{Ps}$ of the static pressure sensor 34 can be made so as not to be substantially affected by the differential pressure Δp and can be made highly sensitive to the static pressure Ps, when the static pressure sensor 34 is arranged at a certain specific radial position of the outer peripheral thick wall portion 12.

Figure 4:
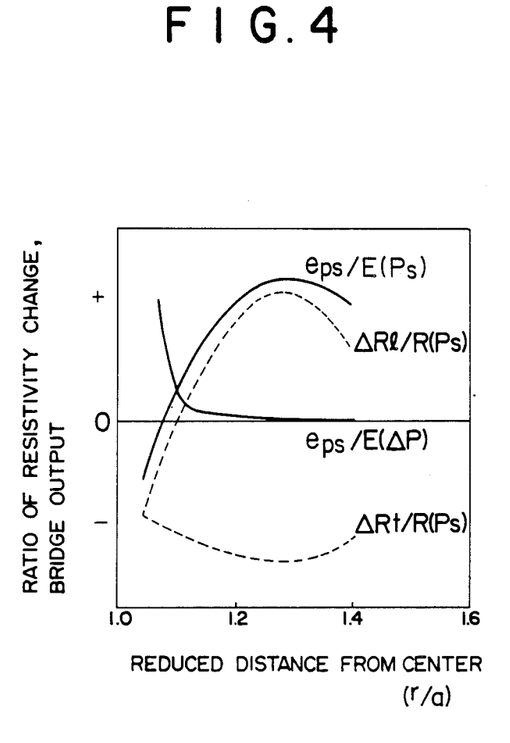
FIG. 4 is a graph showing positional dependence of the gauge or resistance and bridge (sensor) output of the piezoresistors.

The radial position-dependence of the change ΔR$_l$, ΔRt in the resistivities R$_l$, Rt of the piezoresistors 34a, 34b, 34c, 34d and that of each of the bridge outputs e$_{Ps}$/E(Ps) in response to the static pressure Ps, and e$_{Ps}$/E(Δp) in response to the differential pressure Δp thus obtained are shown in the graph of FIG. 4, assuming that the static pressure Ps of 15 MPa is applied to the multi-functional sensor 10 in the case where the flexural rigidity of the silicon diaphragm 10a is 0.3 times of that of the glass base 19, which was proved by the experiments.

Referring to the graph shown in FIG. 4, the following can be indured;

(1) The change in the resistivity R$_l$ of the radial gauges 34a, 34b is opposite to the change in the resistivity Rt of the tangential gauges 34c, 34d. Both of the absolute values of the ratios of change in the resistivities ΔR$_l$/R$_l$, ΔRt/Rt become their maximum in the case r/a=1.25 where r is a radial distance of the static pressure sensor 34 from the center and "a" is a radius of the outer periphery 15 of the thin wall portion 14, thereby maximum bridge output e$_{Ps}$/E(Ps) can be obtained in the case.

(2) The change in the bridge output e$_{Ps}$/E(Δp) of the static pressure sensor 34 is small in the case of r/a=1.25 or so, when the differential pressure Δp is applied to the sensor 10.

One typical example of the multi-functional sensor 10 was designed such that the radius of the diaphragm 10a was 7 mm, the radius "a" of the outer peripheral of the thin wall portion 14 was 5 mm, the radial width of the annular thin wall portion 14 was 1 mm, the thickness of the central thick wall portion 17 was 0.8 mm, the thickness Hs of the peripheral thick wall portion 12 was 1 mm, and the thickness H$_G$ of the glass base 19 was 3 mm. The thickness of the thin wall portion 14 is generally selected to be a magnitude of approximately 50 microns to 0.5 mm which is much thinner than that of the thick wall portions 12, 17. The material of the annular glass support base 19 was borosilicate.

Figure 2A:
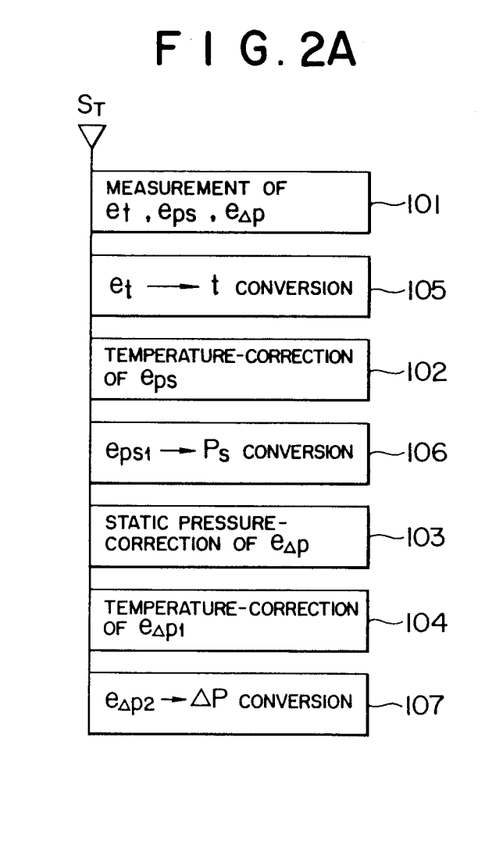
FIG. 2A is a flow chart showing steps of processing the output signals from the multi-functional sensors according to a preferred embodiment of the present invention.
Figure 2B:
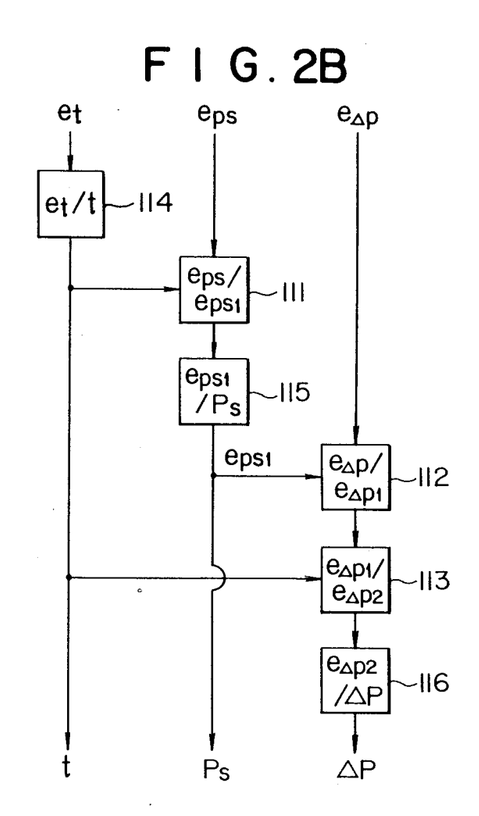
FIG. 2B is a block diagram of a unit for processing output signals from the multi-functional sensor.

FIGS. 2A and 2B show a flow chart and a block diagram of an example where a correct differential pressure Δp is derived from the outputs of the multi-functional sensor 10 thus constructed by means of a signal processing unit 20 including a microprocessor 23.

At first, as shown in step 101 in FIG. 2A, the sensors 32, 30, 34 detect the temperature T, static pressure Ps, and differential pressure Δp to deliver the respective outputs E$_T$, e$_{Ps}$, e$_{ΔT}$.

As the resistor elements 34a, 34b, 34c, 34d of the statics sensor 34 have the same impurity concentrations as the resistor elements 30a, . . . , 30d, 32a of the other sensors 30, 32 in the embodiment above, the temperature-dependent outputs of the sensors 30, 34 can be corrected utilizing the output of the resistor element 32a of the temperature sensor 32.

Then, in a step 102, the detected static pressure output e$_{Ps}$ is temperature-corrected by the temperature correction processing block 111 utilizing the temperature output e$_T$ to obtain temperature-corrected static pressure output e$_{Ps1}$.

In a step 103, differential pressure output e$_{Δp}$ is static pressure-corrected by a static pressure correction processing block 112 utilizing the temperature-corrected static pressure output e$_{Ps1}$ to obtain a static pressure-corrected differential pressure output e$_{Δp1}$.

In a step 104, the static pressure-corrected differential pressure output e$_{Δp1}$ is further temperature-corrected by a temperature-correction processing block 113 utilizing the detected temperature output e$_T$ to obtain a temperature- and static pressure-corrected differential pressure output e$_{Δp2}$.

In steps 105, 106 and 107, the correct temperature T, static pressure Ps and differential pressure Δp are derived from the detected temperature output e$_T$ dependent only on the temperature T, the temperature-corrected static pressure output e$_{Ps1}$ dependent only on the static pressure Ps, and the temperature- and static pressure-corrected differential pressure output e$_{Δp2}$ dependent only on the differential pressure Δp respectively by associated conversion processing blocks 114, 115, 116.

Thus, the differential pressure Δp can be correctly measured removing the influence therein of the temperature T and static pressure Ps, even if the output e$_{Δp}$ of the differential pressure sensor 30 per se is affected by the temperature T because of the temperature dependent change in the resistivities of the diffusion resistors 30a, 30b, 30c, 30d constituting the differential pressure sensor 30, and even if the output e$_{Δp}$ of the differential pressure sensor 30 per se is affected by the static pressure Ps because of the change in the resistivities of the piezoresistor elements 30a, 30b, 30c, 30d of the differential pressure sensor 30 due to the stresses $\sigma_l$, $\sigma_t$ generated in the diaphragm 10a by the presence of the static pressure Ps.

As the deviation of the differential pressure output $e_{\Delta p}$ due to the variation in the static pressure Ps is relatively small, i.e. less than 1/100 of that due to the differential pressure $\Delta p$, according to the embodiment of the present invention, the differential pressure can be detected with a sufficiently high precision, even if the static pressure-correction steps 103, 112 may be omitted.

However, when the multiple sensor is utilized in the differential pressure transmitter as shown in FIG. 5A, it is unavoidable that there will be some mismatch of amounts of expansion/contraction of the sealed liquid 5, 5a in the chambers 15, 14a and some degree of deformation of the casings 7, 7a, 9. The mismatch and/or the deformation will cause the silicon diaphragm 10a to be deformed, which results in the change in the resistivities of the piezoresistors 30a, ..., 30d constituting the differential pressure sensor 30 for example. The effects of the liquid volume mismatch and/or the casing deformation will not be negligible in the case of application to the control of the pipeline 1, because the static pressure Ps applied to both sides of the silicon diaphragm 10a will be no less than 100 atm. In this case, the detection output $e_{\Delta p}$ of the differential pressure sensor 30 is affected not only by the differential pressure $\Delta p$ but also by the static pressure Ps.

However, the influence on the differential pressure sensor output by mismatch of the liquid 5, 5a and the deformation of the casings 7, 7a, 9 can be easily removed, because the correct value of the differential pressure $\Delta p$ can be obtained easily by correcting the influence of the static pressure Ps and the temperature T in the apparatus 90 including the multi-functional sensor 10 with the data processing unit 25 according to the embodiment of the present invention. Therefore, the differential pressure signal transmitter 90 includin9 the multi-functional sensor 10 can be easily made compact and produced at relatively reduced costs.

Figure 5B:
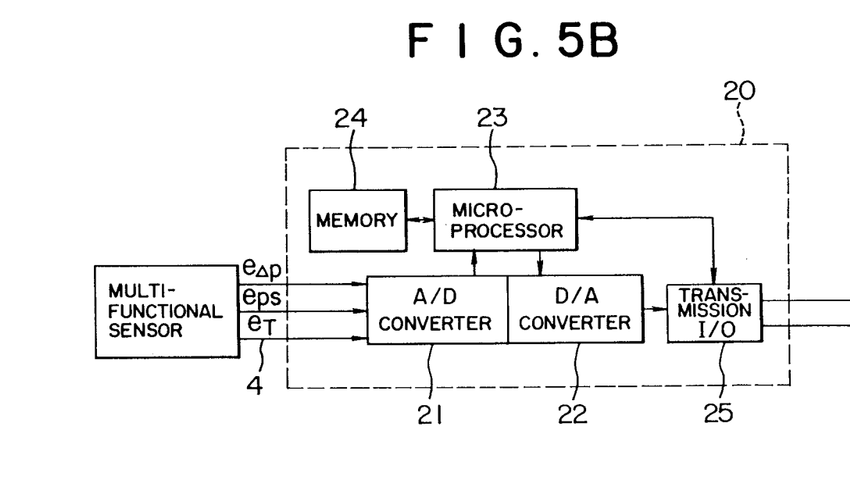
FIG. 5B is a block diagram of a signal processing circuit (20)

As shown in FIG. 5B, the signal processing circuit 20 receives the output signals of the differential pressure, static and temperature sensors 30, 34, 32 through terminals 4. The received signals are converted by an analog-to-digital (A/D) converter 21 into digital signals. A memory unit stores the characteristics of each sensor 30, 34, 32 in the form of map data. The static pressure- and temperature-corrections of the digitally converted output signals of the sensors 30, 34, 32 are carried out by a microprocessor or microcomputer utilizing the map data stored in the memory unit 24. The corrected data or signals are converted by a digital-to-analog (D/A) converter 22 into analog signals which are then transmitted by a transmission I/O 25 in the form of output signals of 4 to 20 mili-ampere.

In FIG. 5A, numeral 4 denotes fluid-tightly or hermetically attached terminals of the sensors, numeral 50 denotes room of supplying a power for the transmitter, numeral 51 denotes a voltmeter for detecting an output current through lines 30, and numeral 40 denotes a hand-held communication apparatus for communicating with the signal processing part 20 of the transmitter.

Figure 3B:
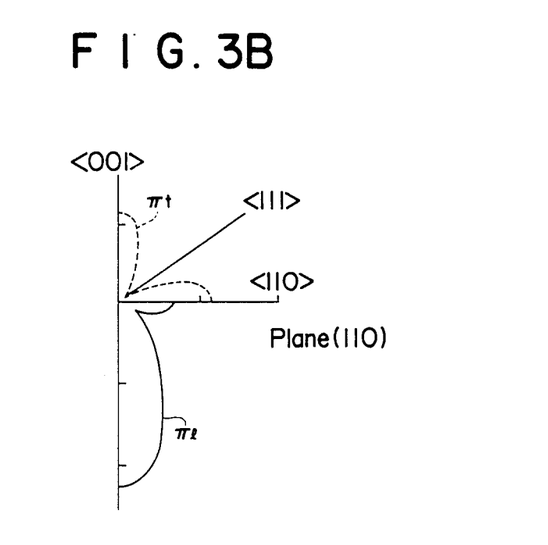
FIG. 3B is a graph showing characteristics of the gauge sensitivities or piezoresistor coefficients of the n-doped diffusion resistor (piezoresistor), for the multi-functional sensor, formed in a principal plane (110) of the single crystalline silicon.

Although only the p-doped or type piezoresistors are employed in the embodiment of the multi-functional sensor above, n-doped or type piezoresistors having anisotropic properties as shown in FIG. 3B instead of, or along with, the p-type piezoresistors can be utilized.

When the n-type piezoresistors are used, it is preferred that the piezoresistor constituting a temperature sensor is arranged along the axis <001> of single crystal silicon, and the piezoresistors constituting the differential pressure sensor and the static pressure sensor are arranged along the axis <001> of the single crystal silicon. In a case where the p-doped resistor elements and n-doped resistor elements are used in combination with each other on the silicon diaphragm, degree of freedom in the design of piezoresistor arrangement is enhanced because maximum and/or minimum sensitivity axis of either type of resistor can be selected as desired. In this combined case, the structure of the diffusion resistor elements will be n-p-n or p-n-p to establish desired isolation of the resistor elements.

Although material combination of the sensor comprises silicon for the diaphragm 10a and the borosilicate glass for the support base 19 in the embodiment above, the diaphragm 10a may be made from other material such as germanium single crystal having diffusion resistors with piezoresistive property and the base 19 may be made from suitable glass or ceramic material having substantially the same thermal expansion coefficient as germanium, so that the similar effects as the explained embodiment can be obtained.

More specifically, the criteria for selecting the combination of the material is as follows:

(1) Young's moduli of the two material should be different.
(2) Thermal expansion coefficients of the two material should be comparable; and preferably,
(3) Material for the base 19 should be capable of being subject to anodic bonding with the diaphragm 10a as in the embodiment. The anodic bonding technology is described in detail in the U.S. Pat. No. 3,397,278, which can be incorporated in the bonding of the diaphragm 10a with the base 19 in the present invention, where ions mobile over the two material should be contained in at least one of the two material.

More specifically, in the multi-functional sensor of the embodiment above, the silicon diaphragm can be secured to the borosilicate glass base, for example, by an electrostatic force produced by transfer of ions from the glass base into the silicon diaphragm under a voltage applied thereacross when the silicon diaphragm and the borosilicate glass base are superposed and heated to a relatively high temperature but below melting points of both materials.

As the differential pressure sensor, the static pressure sensor and the temperature sensor are integrated on one single crystalline semiconductor chip such as a single crystalline silicon chip, as the temperature sensor can detect the temperature without depending on the other parameters such as the static pressure and the differential pressure, and as the static pressure sensor can detect the static pressure highly sensitively without being substantially affected by the differential pressure, the detection output of the differential pressure sensor can be corrected to remove the effects of the outer disturbances such as the temperature and the static pressure by relatively simple and rapid correction processing. Therefore, highly accurate and precise differential pressure transmitter which is not easily affected by outer disturbances can be provided.

What is claimed is:

1. Multi-functional sensor comprising:

a support base made from borosilicate;

a diaphragm with a E-shaped section secured to the base, the diaphragm being made from single crystalline silicon, principal plane thereof being oriented to be a crystalline plane (110);

a differential pressure sensor having p-doped piezoresistor elements formed in the principal plane of the diaphragm at a thin wall portion of the E-shaped sectional diaphragm, each element being arranged along a crystal axis <111>;

a static pressure sensor having p-doped piezo-resistor elements formed in the principal plane at an outer peripheral thick wall portion of the E-shaped sectional diaphragm, each element being arranged along the crystal axis <111>; and a temperature sensor having a p-doped piezo-resistor element formed in the principal plane at the outer peripheral thick wall portion of the E-shaped sectional diaphragm, the element being arranged along a crystal axis <100>.

2. Multi-functional sensor according to claim 1, wherein the silicon diaphragm is secured to the base of borosilicate glass by an electrostatic force produced by transfer of ions from the glass base into the silicon diaphragm under a voltage applied thereacross when the silicon diaphragm and the borosilicate glass base are superposed and heated to a temperature below melting points of both materials.

3. Multi-functional sensor comprising:

a support base made from a first material;

a diaphragm made of a second material and fluid-tightly secured to the support base;

a differential pressure sensing transducer provided at a part of the diaphragm for detecting a differential pressure between the pressure on both sides of the diaphragm and for converting an electrical quantity such as electrical resistivity;

a static pressure sensor provided at a part of the diaphragm for responding to an overall static pressure applied to the multi-functional sensor; and a temperature sensor provided at a part of the diaphragm for responding to a temperature;

wherein the temperature sensor responds only to the temperature, the static pressure sensor does not respond to the differential pressure but responds to the static pressure and the temperature, and further wherein the second material comprises single crystalline silicon, the first material comprises borosilicate, each of the differential pressure, temperature and static pressure sensors comprises one or more piezoresistors, the piezoresistors for the differential pressure sensor and for the static pressure sensor are oriented along a crystalline axis where maximum sensitivity can be obtained, while the piezoresistor for the temperature sensor is oriented along a crystalline axis where minimum sensitivity can be obtained.

4. Multi-functional sensor comprising:

a diaphragm of a first material having a thin wall portion at a part thereof, and thick wall portion at an outer periphery thereof;

a base made of a second material having a Young's modulus smaller than that of the first material of the diaphragm and a flexural rigidity higher than that of the diaphragm, the base being secured to the outer periphery thick wall portion of the diaphragm; and a temperature sensor and a static pressure sensor, both sensors being arranged on parts of the outer peripheral thick wall portion of the diaphragm where stress due to differential pressure does not affect the sensors, the static pressure sensor being situated at a position where maximum effects by the static pressure can be obtained, wherein the static pressure is applied to the multi-functional sensor.

5. Differential pressure signal transmitter comprising:

a casing;

seal diaphragm at both sides in the casing to define a chamber in the casing;

a center diaphragm and multi-functional sensor secured to the casing therein to a cooperatively separate the chamber fluid-tightly into two sub-chambers, the multi-functional sensor having the static pressure, differential pressure and temperature sensors;

liquid filled in the sub-chambers so that a static pressure and a differential pressure led to the two seal diaphragms are transferred correctly to both sides of the multi-functional sensor;

electrical terminals fluid-tightly attached to the casing, the terminals being electrically connected to the static pressure, differential pressure and temperature sensors enabling to allow them to be picked-up in the form of analog the electrical signals from signals; and a signal processing part including an analog-digital converter for converting the analog signals from the terminals into digital signals, a memory unit for storing the digital signals therein, and a microprocessor for processing the signals stored in the memory unit.

* * * * *